US011865856B2

(12) United States Patent
Correas et al.

(10) Patent No.: US 11,865,856 B2
(45) Date of Patent: Jan. 9, 2024

(54) ANTI-FIDGETING SPINNING DEVICE

(71) Applicants: Isabella Sofia Correas, Newnan, GA (US); Dasha Smallwood, Newnan, GA (US)

(72) Inventors: Isabella Sofia Correas, Newnan, GA (US); Dasha Smallwood, Newnan, GA (US)

(*) Notice: Subject to any disclaimer, the term of this patent is extended or adjusted under 35 U.S.C. 154(b) by 63 days.

(21) Appl. No.: 17/490,889

(22) Filed: Sep. 30, 2021

(65) Prior Publication Data

US 2022/0096946 A1 Mar. 31, 2022

Related U.S. Application Data

(60) Provisional application No. 63/085,544, filed on Sep. 30, 2020.

(51) Int. Cl.
*B43K 29/00* (2006.01)
*A63H 33/00* (2006.01)
*A63H 29/08* (2006.01)
*A63H 1/20* (2006.01)

(52) U.S. Cl.
CPC ............... *B43K 29/00* (2013.01); *A63H 1/20* (2013.01); *A63H 29/08* (2013.01); *A63H 33/003* (2013.01)

(58) Field of Classification Search
CPC ... A63H 1/00; A63H 1/08; A63H 1/10; A63H 1/20; B43K 29/00; B43K 29/002
USPC ......................... 446/236, 240, 241, 243, 266
See application file for complete search history.

(56) References Cited

U.S. PATENT DOCUMENTS 3,287,846 A * 11/1966 Frangos .................. A63H 1/00 446/250
4,440,399 A * 4/1984 Smith .................... A63B 63/06 446/241
5,505,553 A * 4/1996 Saviano ............... B43K 23/004 401/117

(Continued)

FOREIGN PATENT DOCUMENTS

KR 101837912 3/2018

OTHER PUBLICATIONS

4-Pack Pencils Topper Fidgets (Pencils Included!), Special Supplies, Available Online at: https://specialsupplies.com/4-pack-pencil-topper-fidgets-pencils-included?_ vsrefdom=adwords&gclid=EAlalQobChMI_Mu9w8X_6glVg-DICh04TQddEAQYBiABEgLs-PD_BWE, Accessed from Internet on Sep. 29, 2021, pp. 1-3.

(Continued)

*Primary Examiner* — Joseph B Baldori
(74) *Attorney, Agent, or Firm* — Kilpatrick Townsend & Stockton LLP

(57) ABSTRACT

Aspects of the present invention relate to an anti-fidgeting device. In an aspect, the anti-fidgeting device includes a head, or a first member, that is coupled to a writing instrument. The writing instrument extends at least partially through the first member. The anti-fidgeting device includes a body, or a second member, that is coupled to the writing instrument. The writing instrument extends at least partially through the second member. The anti-fidgeting device includes a spinning mechanism that is positioned at least partially between the first member and the second member. The writing instrument extends through the spinning mechanism. The spinning mechanism is rotatable around the writing instrument.

20 Claims, 9 Drawing Sheets

(56) References Cited

U.S. PATENT DOCUMENTS

| | | | | |
|---|---|---|---|---|
| 6,158,914 | A * | 12/2000 | Junkins | B43K 8/003 401/52 |
| 6,612,766 | B2 * | 9/2003 | Collins | B43K 29/00 401/52 |
| 6,966,717 | B1 * | 11/2005 | Kuo | B43K 5/005 401/195 |
| 7,774,963 | B2 * | 8/2010 | Puglisi | G09F 23/00 40/334 |
| D624,126 | S | 9/2010 | Butler | |
| 9,211,757 | B2 * | 12/2015 | Osborne | B43K 29/00 |
| 9,914,063 | B1 * | 3/2018 | McCoskery | A63F 9/16 |
| 9,950,556 | B1 * | 4/2018 | Laemle | B43K 23/08 |
| 10,016,693 | B1 | 7/2018 | Dowdy et al. | |
| 10,086,641 | B1 * | 10/2018 | Vazquez | B43K 29/00 |
| 10,293,633 | B2 | 5/2019 | Hoffman | |
| 10,328,743 | B2 * | 6/2019 | Marshall | B43K 29/08 |
| 10,406,450 | B2 | 9/2019 | Howard | |
| 10,414,204 | B2 | 9/2019 | Laemle et al. | |
| 10,859,266 | B2 * | 12/2020 | Romero | F23Q 2/167 |
| 10,966,898 | B2 * | 4/2021 | Nichols | A61H 7/001 |
| 11,002,316 | B2 * | 5/2021 | Bristow | A63H 1/00 |
| 11,241,906 | B1 * | 2/2022 | Hobbs | A61M 21/02 |
| 2003/0194257 | A1 * | 10/2003 | Collins | B43K 29/007 401/88 |
| 2007/0048061 | A1 * | 3/2007 | Travers | B43K 23/001 401/6 |
| 2007/0059089 | A1 * | 3/2007 | Junkins | B43K 25/024 401/195 |
| 2008/0175650 | A1 * | 7/2008 | Geddes | B43K 29/00 401/195 |
| 2011/0103877 | A1 * | 5/2011 | Liu | B43K 29/00 401/195 |
| 2012/0318707 | A1 * | 12/2012 | Zivitz | B43K 29/007 401/6 |
| 2018/0043729 | A1 * | 2/2018 | Perez | B43K 29/00 |
| 2019/0060774 | A1 * | 2/2019 | Zhong | A44C 9/0053 |
| 2019/0160388 | A1 | 5/2019 | Hacsi | |
| 2022/0184517 | A1 * | 6/2022 | Lester | A63H 1/00 |

OTHER PUBLICATIONS

Aroma Pencil Diffusers Are a Great Gift for Kids and Adults, Etsy, Available Online at: https://www.etsy.com/listing/743302834/aroma-pencil-diffusers-are-a-great-gift?ga_order=most_relevant&ga_search_type=all&ga_view_type=gallery&ga_search_query=fidget+pencil&ref=sr_gallery-1-14&organic_search_click=1&frs=1&col=1, Accessed from Internet on Sep. 29, 2021, pp. 1-6.

Customized Mop Topper Spinner Ball Pen, 4 All Promos, Accessed from Internet on Sep. 30, 2021, pp. 1-5.

Fidget Pencil Toppers, OTC Direct, Accessed from Internet on Sep. 30, 2021, pp. 1-3.

Fidget Pencils, Etsy, Available Online at: https://www.etsy.com/listing/816993431/fidget-pencils?ga_order=most_relevant&ga_search_type=all&ga_view_type=gallery&ga_search_query=fidget+pencil&ref=sr_gallery-1-5&organic_search_click=1, Accessed from Internet on Sep. 29, 2021, pp. 1-10.

One Dozen Spinning Flower Pens, Mercari, Available Online at: https://www.mercari.com/us/item/m43769087954/, Accessed from Internet on Sep. 29, 2021, pp. 1-2.

Spinner Pens, DiscountMugs, Accessed from Internet on Sep. 29, 2021, pp. 1-2.

Spinning Pencil Topper Moving Parts Fidget Spinner, Etsy, Accessed from Internet on Sep. 30, 2021, pp. 1-9.

Spinnit Fidget Pen, Positive Promotions, Available Online at: https://www.positivepromotions.com/spinnit-fidget-pen/p/ost-500/?utm_source=google&utm_medium=cpc&utm_campaign=shoppingtab&gclid=EAIaIQobChMlmqrYzuiU6wIVX4NaBR3BYgp3EAsYISABEgl8uPD_BWE, Accessed from Internet on Sep. 29, 2021, pp. 1-2.

* cited by examiner

ANTI-FIDGETING SPINNING DEVICE

CROSS-REFERENCES TO RELATED APPLICATIONS

This application claims the benefit of U.S. Provisional Application No. 63/085,544 filed Sep. 30, 2020, the contents of which is hereby incorporated by reference in its entirety for all purposes.

TECHNICAL FIELD

This disclosure relates generally to a spinning device that can be attached to a writing instrument such as a pencil or pen to provide a distraction.

SUMMARY

Aspects of the present invention relate to an anti-fidgeting device. In an aspect, the anti-fidgeting device includes a head, or a first member, that is coupled to a writing instrument. The writing instrument extends at least partially through the first member. The anti-fidgeting device includes a body, or a second member, that is coupled to the writing instrument. The writing instrument extends at least partially through the second member. The anti-fidgeting device includes a spinning mechanism that is positioned at least partially between the first member and the second member. The writing instrument extends through the spinning mechanism. The spinning mechanism is rotatable around the writing instrument.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Disclosed solutions include spinning devices that can help individuals who are prone to distraction or fidgeting, such as children. A spinning device can be placed on a writing instrument, or any other similarly sized and shaped object, and can include a head (or a first member), a body (or a second member), and a spinning mechanism. Examples of writing instruments include pens, pencils, fountain pens, crayons, and the like. The spinning mechanism can spin freely around the writing instrument, thereby providing an outlet for fidgeting. The head, spinning mechanism, and/or body can be circular or cylindrical in shape.

Advantages of the spinning device include reducing a need for a separate fidget toy, thereby increasing productivity. For instance, a student may need to hold a pencil during school to take notes or do schoolwork. Because the spinning device can be attached to the pencil, a second utensil or device is not required. The spinning device may also be removable from the writing instrument and can be customized for preferences of a user, for example, with different designs.

In some aspects, the spinning device includes wings, which are attached to the spinning mechanism and can receive essential oils or other fragrances. In this manner, the spinning device promotes concentration and promotes calming by releasing essential oils or fragrances.

Figure 1:
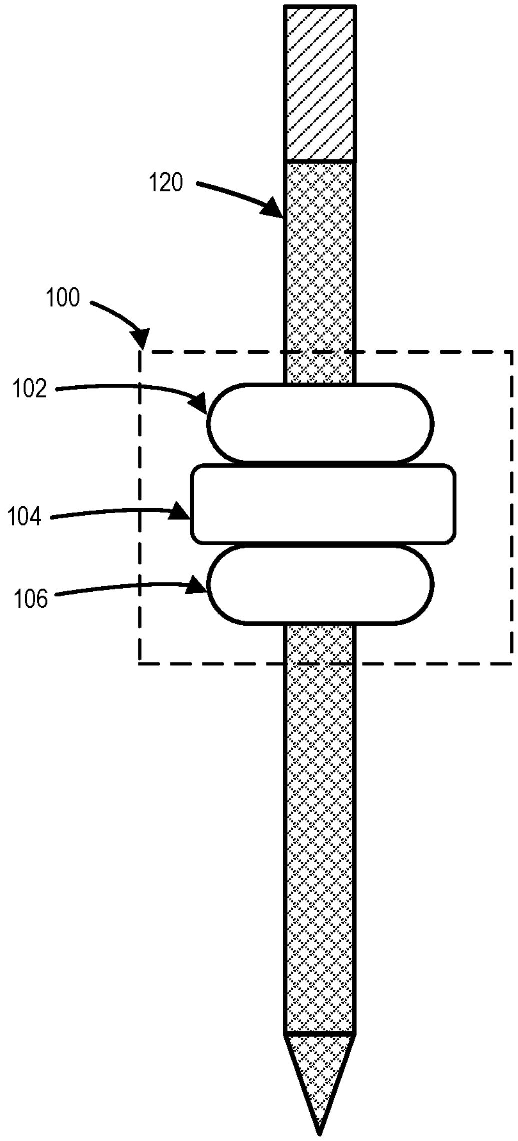
FIG. 1 depicts an exemplary spinning device, in accordance with an aspect of the present disclosure.

Turning now to the Figures, FIG. 1 depicts an exemplary spinning device, in accordance with an aspect of the present disclosure. FIG. 1 depicts spinning device 100 and writing instrument 120. Writing instrument 120 is inserted into spinning device 100, thereby coupling spinning device 100 to the writing instrument 120. In some cases, spinning device 100 is affixed to the writing instrument 120, for example with an adhesive. In other cases, spinning device 100 is coupled to the writing instrument 120 using a snap-fit, friction-fit, or any other suitable form of coupling. In still further cases, spinning device can be removed from writing instrument 120, permitting writing instrument 120 to be exchanged for another writing instrument.

Spinning device includes a head 102 (a first member), a spinning mechanism 104, and a body 106 (a second member). As depicted, the head 102, spinning mechanism 104, and body 106 are each approximately circular in shape and wrap around the writing instrument 120. However, the head 102, spinning mechanism 104, and/or body 106 may form any other suitable shape, e.g., square, rectangular, triangular, oval, etc. As depicted, spinning mechanism 104 has a diameter which is larger than the diameters of both head 102 and body 106. Other relative diameters are possible.

As can be seen, the head 102 is typically oriented towards the top of writing instrument 120 (e.g., nearest to the end of a pencil that attaches to an eraser). In some aspects, head 102 is removable. Head 102 can be affixed to the writing instrument 120 (e.g., not able to rotate) and thereby hold the spinning mechanism 104 in place. Spinning mechanism 104 can be placed below the head and can spin around the writing instrument 120. Body 106 can be located below the spinning mechanism 104 (e.g., closer to the writing end of writing instrument 120), and can be fixed to writing instrument 120, thereby holding the spinning mechanism 104 in place. In some aspects, head 102 and/or body 106 are separately removable. Additionally, head 102 and body 106 may be positioned at opposite locations so that head 102 is positioned below the spinning mechanism 104 (e.g., closer to the writing end of writing instrument 120) and body 106 is positioned towards the top of writing instrument 120 (e.g., nearest to the end of a pencil that attaches to an eraser).

Each of the components of spinning device 100, e.g., head 102, spinning mechanism 104, and body 106, can be made of one or more materials and each of the components of spinning device 100 may be made from the same or different material(s). Examples of suitable materials include metal, wood, and plastic (e.g., instamorph or moldable plastic). In one example, the head and the body are made from plastic or moldable plastic and the spinning mechanism is made of metal. Examples of suitable spinning mechanisms include circular objects such as washers, disks, bolts, and the like.

In some aspects, spinning mechanism 104 can include a weight on one side of the spinning mechanism 104. In this manner, if the writing instrument is leaning to one side, the weighted side is oriented downward when the spinning mechanism 104 is not rotating. In some aspects, spinning device 100 can be configured for left-handed or right-handed use.

In some aspects, the components of spinning device 100, e.g., head 102, spinning mechanism 104, and body 106 can be mounted adjacent to, e.g., perpendicular to, writing instrument 120. For example, an axis of rotation of the spinning mechanism 104 can pass through the axis of writing instrument 120.

Figure 2:
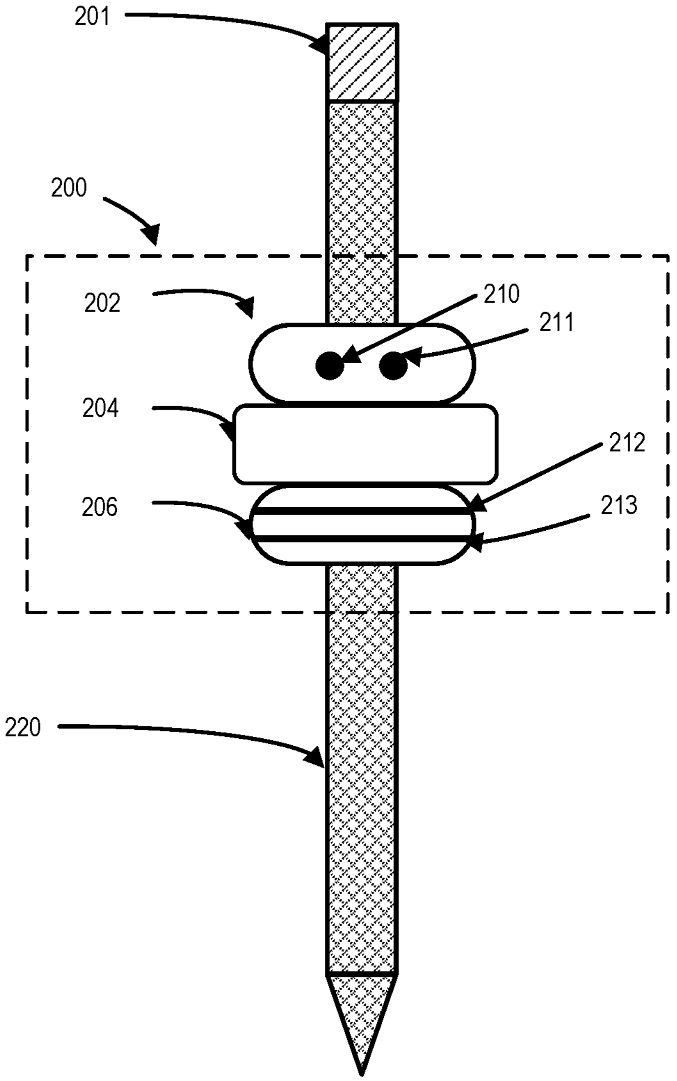
FIG. 2 depicts an exemplary spinning device having markings thereon, in accordance with an aspect of the present disclosure.

FIG. 2 depicts an exemplary spinning device having markings thereon, in accordance with an aspect of the present disclosure. FIG. 2 depicts spinning device 200 and writing instrument 220. Spinning device 200 includes a head 202, a spinning mechanism 204, and body 206. For example purposes, writing instrument is depicted as a pencil, but other types of writing instruments are possible. Writing instrument 220 includes eraser 201. The spinning device 200 and writing instrument 220 may have the same or similar components as the spinning device 100 and the writing instrument 120 described above with respect to FIG. 1.

Relative to FIG. 1, some components of FIG. 2 include markings. As can be seen, head 202 includes circle markings 210 and 211. Body 206 includes two substantially parallel lines 212 and 213 (linear markings) that extend around the body 206. Markings are also possible on spinning mechanism 204, but are not shown. Other types of markings are possible.

Figure 3:
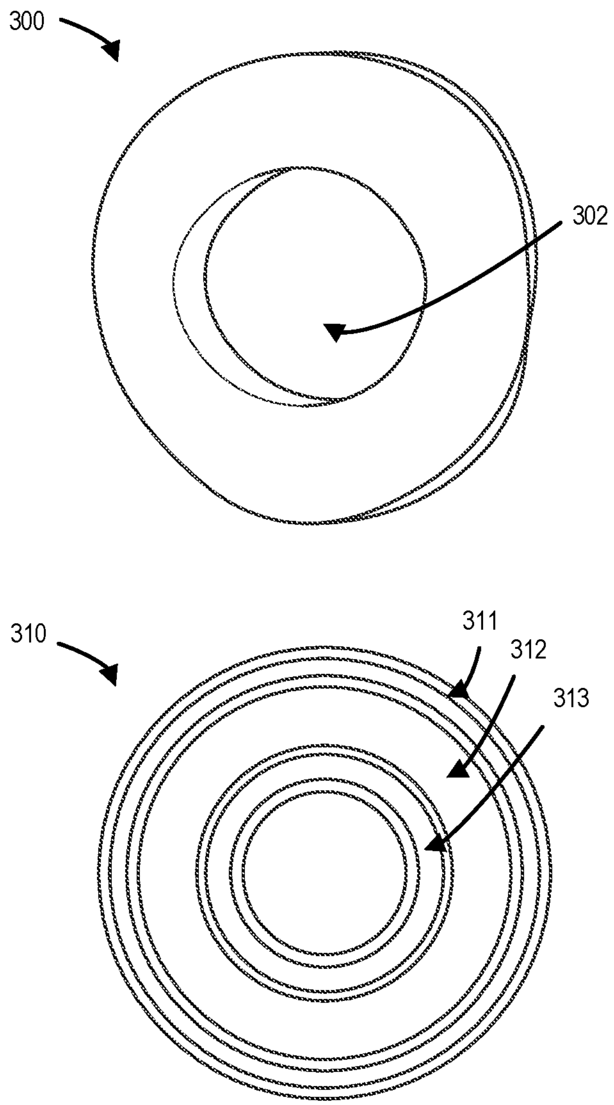
FIG. 3 depicts examples of components of a spinning device, in accordance with an aspect of the present disclosure.

FIG. 3 depicts examples of components of a spinning device, in accordance with an aspect of the present disclosure. FIG. 3 includes an elevation view of a head 300 and an elevation view of spinning mechanism 310. The head 300 and spinning mechanism 310 may have the same or similar components as the head 100, 200 and the spinning mechanism 110, 120 described above with respect to FIGS. 1 and 2.

As can be seen, head 300 and spinning mechanism 310 are substantially circular, each with a center hole that is substantially circular or circular and is sized to receive a writing instrument. Head 300 is formed of molded plastic, and therefore, in some cases is not uniform in shape. Head 300 includes opening 302, through which a writing instrument can be inserted.

By contrast, spinning mechanism 310 is formed of metal. Suitable metals include stainless steel or other alloys, copper, silver, gold, etc. Spinning mechanism 310 includes an outer ring 311, an inner portion 312, and an inner ring 313. A writing instrument can be inserted through an opening in inner portion 312. A writing instrument can be inserted into spinning mechanism 310 through the opening in inner portion 312. In some cases, inner ring 313 can be affixed to the writing instrument and the outer ring 311 is free to rotate.

In an aspect, spinning mechanism 310 includes ball bearings or similar movable objects (not shown) located within inner portion 312, between the inner ring and the outer ring. The ball bearings are held in place between the inner ring and the outer ring and facilitate smoother rotation.

Figure 4:
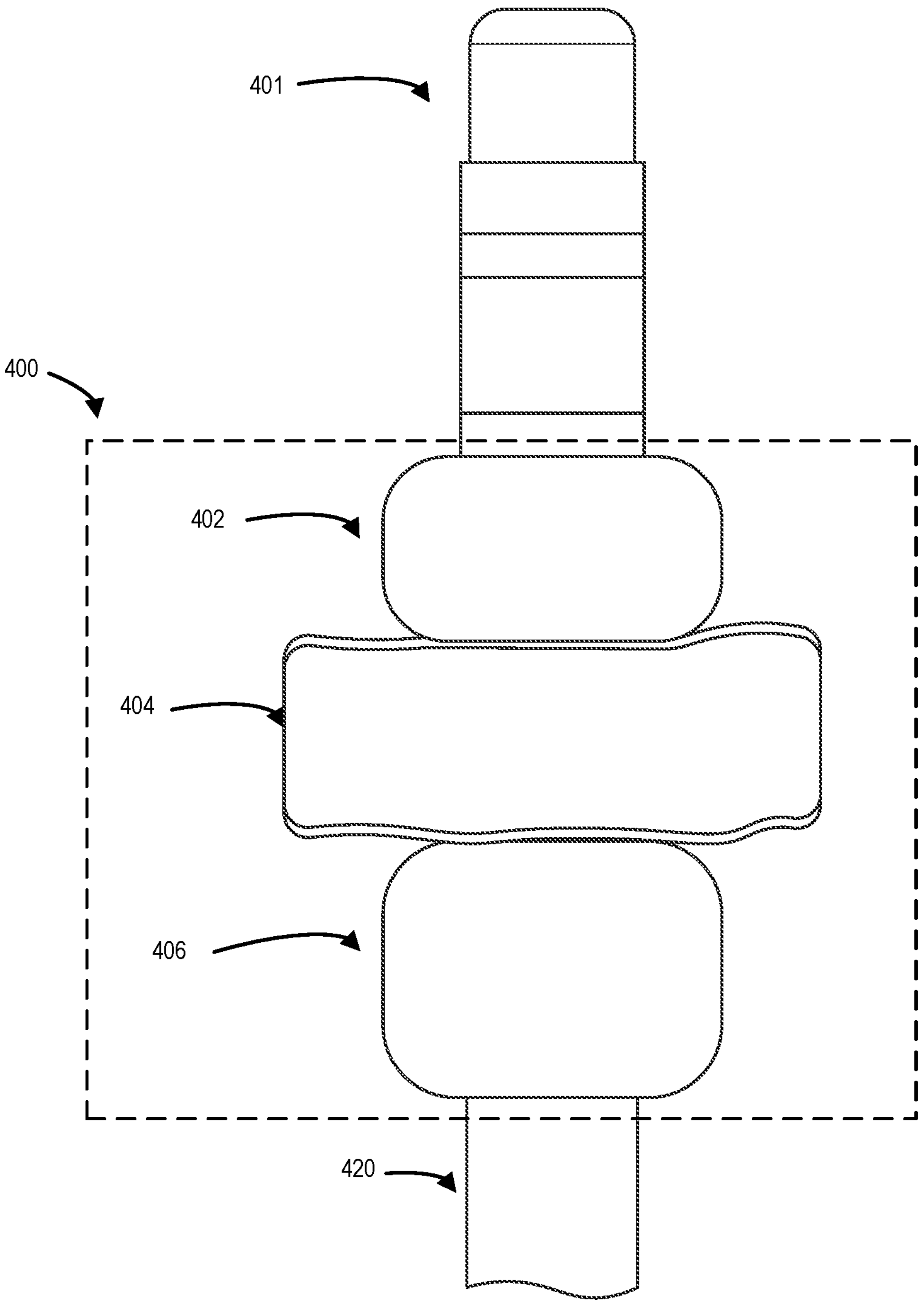
FIG. 4 depicts an exemplary spinning device formed from malleable components, in accordance with an aspect of the present disclosure.

In some cases, the components of a spinning device may not be removable from the writing instrument. For instance, if the head and body are made of instamorph plastic and are molded onto the writing instrument, the head and the body may not be removable. FIG. 4 is one such example.

FIG. 4 depicts an exemplary spinning device formed from malleable components, in accordance with an aspect of the present disclosure. FIG. 4 depicts spinning device 400 and writing instrument 420. Spinning device 400 includes head 402, spinning mechanism 404, and body 406. Writing instrument 420 includes eraser 401. Relative to the spinning device depicted in FIGS. 1 and 2, FIG. 4 is formed of malleable components such as molded plastic, rubber, latex, silicone. In some aspects, the spinning device 400 and writing instrument 420 may have the same or similar components as the spinning device 100, 200 and the writing instrument 120, 220 described above with respect to FIGS. 1 and 2.

Spinning mechanism 404 is free to rotate around the writing instrument 420 in either direction and is supported by head 402 and body 406. As can be seen, head 402 and body 406 are spherical in shape and are molded to the writing instrument 420. Accordingly, in this aspect, spinning device 400 may be single-use, that is, disposable when the writing instrument 420 can no longer be used.

Figure 5:
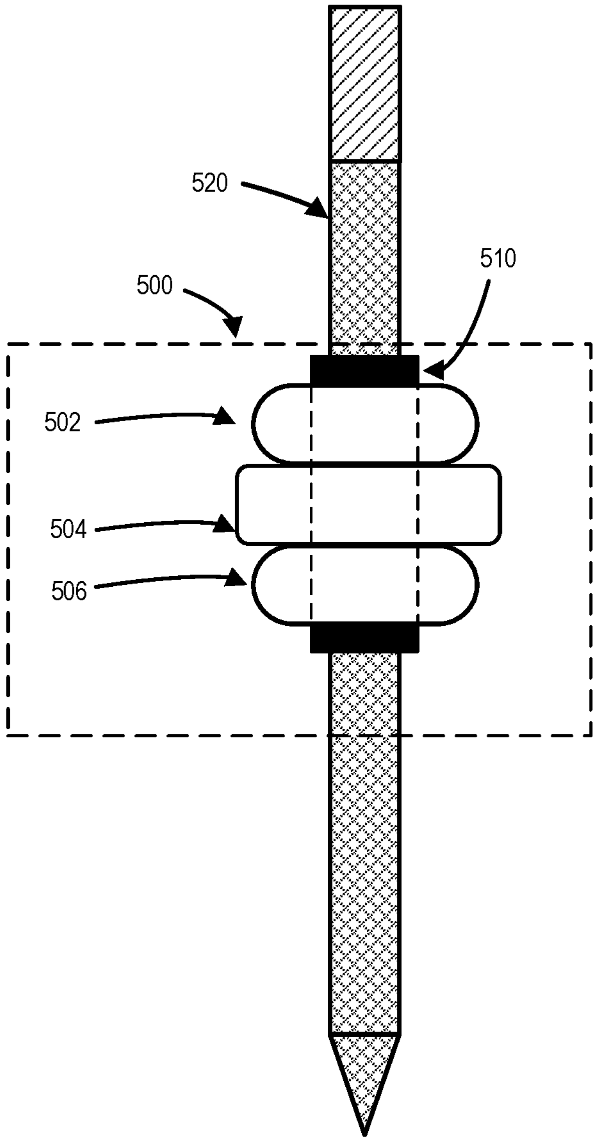
FIG. 5 depicts an exemplary spinning device with an inner mount, in accordance with an aspect of the present disclosure.

FIG. 5 depicts an exemplary spinning device with an inner mount, in accordance with an aspect of the present disclosure. FIG. 5 depicts a spinning device 500 and writing instrument 520. Spinning device 500 includes head 502, spinning mechanism 504, body 506, and inner mount 510. Head 502, an inner part of spinning mechanism 504, and body 506 are attached to inner mount 510. In some aspects, the spinning device 500 and writing instrument 520 may have the same or similar components as the spinning device 100, 200, 400 and the writing instrument 120, 220, 420 described above with respect to FIGS. 1, 2, and 4.

Inner mount 510 is placed between head 502 and writing instrument 520, between spinning mechanism 504 and writing instrument 520, and between body 506 and writing instrument 520. The inner mount 510 therefore is configured to receive writing instrument 520, so that the inner mount 510 can slide up and down relative to the writing instrument 520 with an application of force. In this manner, spinning device 500 can be removed from writing instrument 520 and placed on another writing instrument, for instance, when writing instrument 520 needs to be replaced.

In an aspect, spinning device 500 can be removed from writing instrument 520 and can operate as a self-standing anti-fidgeting device. In this case, inner mount 510 is attached to head 502, spinning mechanism 504, and body 506.

In some examples, the spinning mechanism 504 can include a set of grooves or mechanical teeth (not depicted) on an inner surface of inner mount 510 to hold the spinning device at a constant position with respect to the top and bottom of the writing instrument. In some cases, the set of grooves or mechanical teeth may have a directional bias that only permits repositioning in one direction such as to prevent the spinning device from impeding the hand position of the user using the writing instrument for writing.

Figure 6:
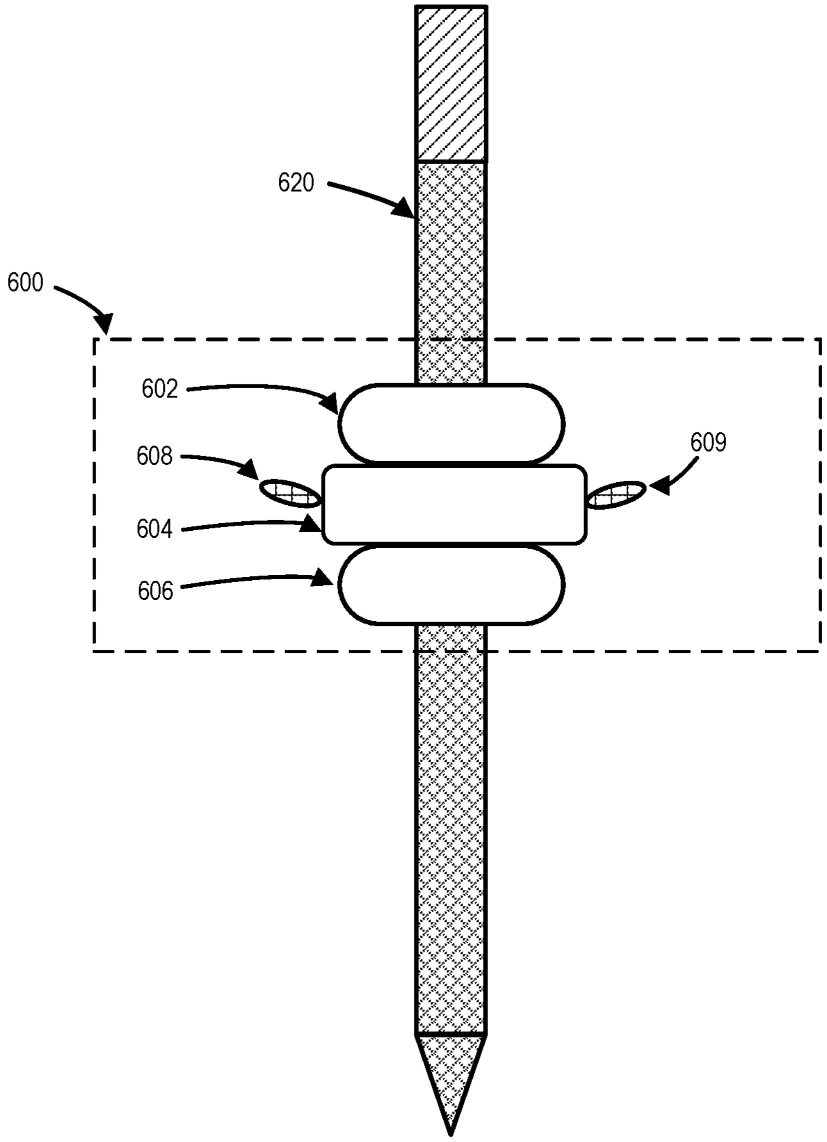
FIG. 6 depicts an exemplary spinning device with wings, in accordance with an aspect of the present disclosure.

FIG. 6 depicts an exemplary spinning device with wings, in accordance with certain aspects of the present disclosure. FIG. 6 depicts a spinning device 600 and writing instrument 620. Spinning device 600 includes head 602, spinning mechanism 604, and body 606. Wings 608 and 609 are connected to spinning mechanism 604. In some examples, wings 608 and 609 can be attached to head 502 or body 506

(not shown). Examples of wings include feathers, felt, or other absorbent material. The spinning device 600 and writing instrument 620 may have the same or similar components as the spinning device 100, 200, 400, 500 and the writing instrument 120, 220, 420, 520 described above with respect to FIGS. 1-2 and 4-5.

Wings 608 and 609 are attached to spinning mechanism 604. Wings can be distributed around spinning mechanism 604 evenly (e.g., two wings 180 degrees apart) or unevenly. While two wings 608 and 609 are depicted, any number of wings are possible. For example, one wing, three wings, four wings, etc. are possible. Wings 608 and 609 can be made of felt, feathers, plastic, wood, or other material. Essential oils or other aromatic chemicals can be placed on or applied to wings 608 and 609. As spinning mechanism 604 spins, the wings 608 and 609 can release the essential oils into the air, thereby calming the user. Upon spinning the spinning mechanism (e.g., with one's thumb or finger or by rotating the writing instrument), the aroma of the essential oils is released into the air. Wings 608 and 609 may absorb some of the essential oils such that the essential oils do not spill.

Figure 7:
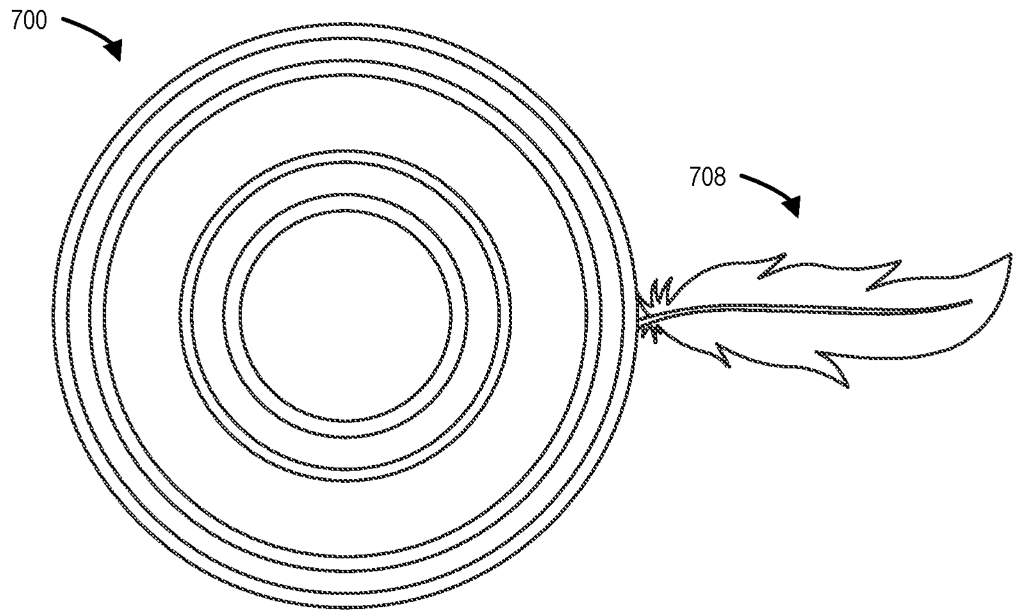
FIG. 7 depicts examples of a spinning mechanism with a wing, in accordance with an aspect of the present disclosure.

FIG. 7 depicts an example of a spinning mechanism with a wing, in accordance with certain aspects of the present disclosure. FIG. 7 includes spinning mechanism 700 and wing 708. The spinning mechanism 700 may include the same or similar components as the spinning mechanisms discussed with respect to FIGS. 1-6.

Figure 8:
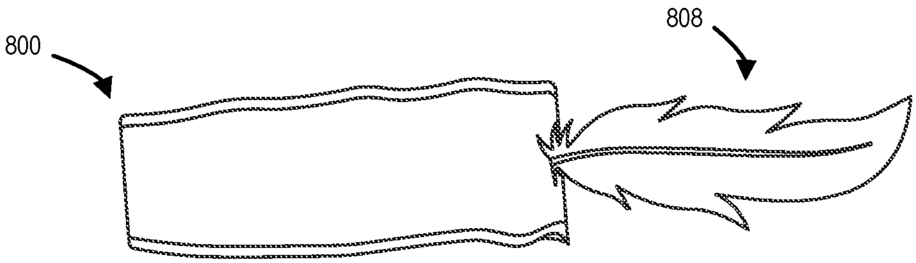
FIG. 8 depicts side view of an example of a spinning mechanism with a wing, in accordance with an aspect of the present disclosure.

FIG. 8 depicts a side view of an example of a spinning mechanism with a wing, in accordance with certain aspects of the present disclosure. FIG. 8 includes spinning mechanism 800 and wing 808. The spinning mechanism 800 may include the same or similar components as the spinning mechanisms discussed with respect to FIGS. 1-7.

Figure 9:
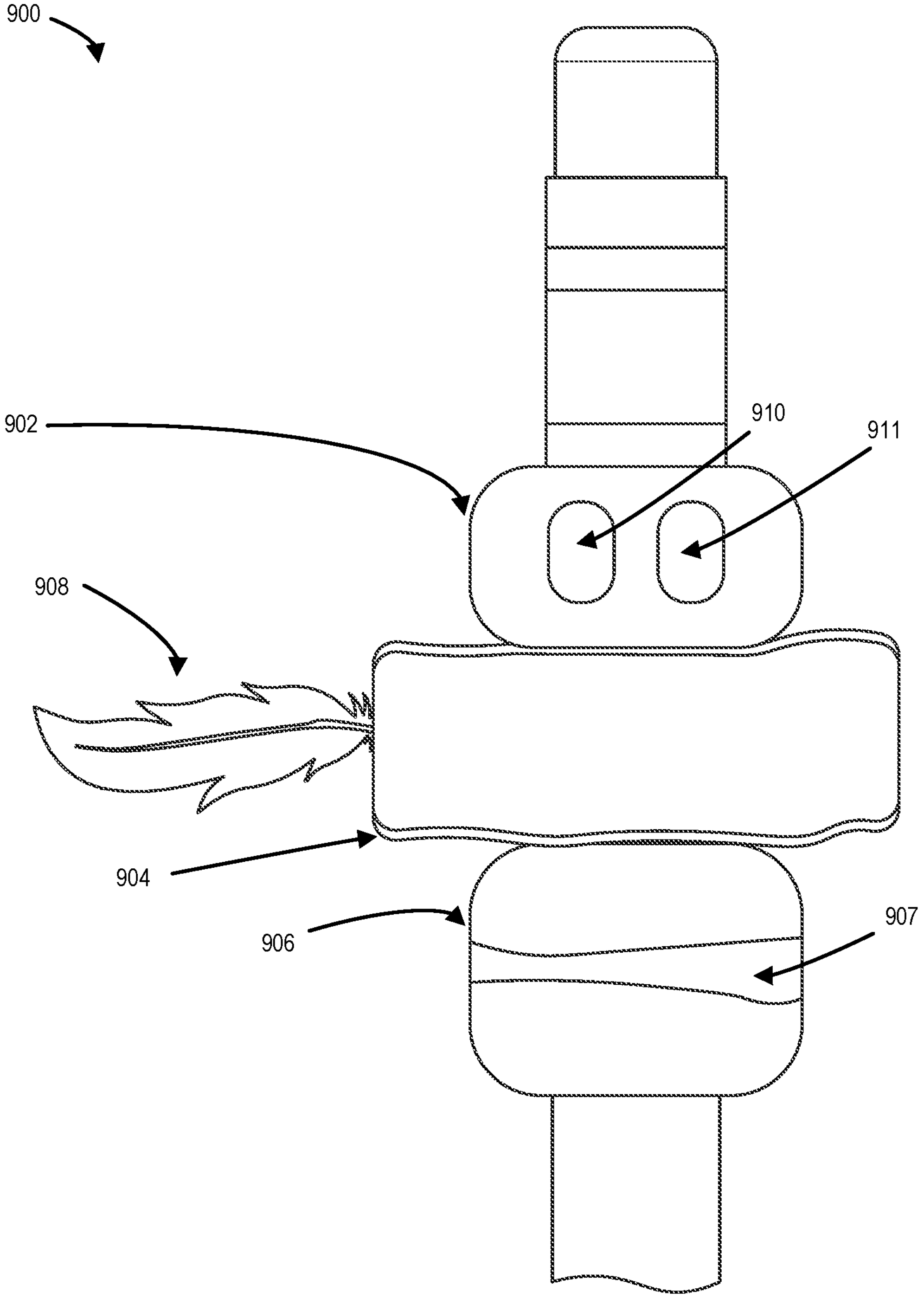
FIG. 9 depicts an exemplary spinning device with a wing and markings, in accordance with an aspect of the present disclosure

FIG. 9 depicts an exemplary spinning device with a wing and markings, in accordance with certain aspects of the present disclosure. FIG. 9 depicts spinning device 900, which includes a head 902, a spinning mechanism 904, a body 906, and wing 908. Some components of FIG. 9 include markings. As can be seen, head 902 includes circle markings 910 and 911. Body 906 includes a line marking 907 that extends around the body 906. Markings are also possible on spinning mechanism 204, but are not shown. Other types of markings are possible. The spinning device 900 and writing instrument 920 may have the same or similar components as the spinning devices and the writing instruments described above with respect to FIGS. 1-2 and 4-6.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. An anti-fidgeting device comprising:

a first member that is coupled to a writing instrument, wherein the writing instrument extends at least partially through the first member;

a second member that is coupled to the writing instrument, wherein the writing instrument extends at least partially through the second member;

a spinning mechanism that is positioned at least partially between the first member and the second member, wherein the writing instrument extends through the spinning mechanism, and wherein the spinning mechanism is rotatable around the writing instrument;

a mount that is cylindrical, configured to receive the writing instrument, and configured to move longitudinally relative to the writing instrument when a force is applied to the mount, wherein the mount defines an inner surface that includes a set of grooves configured to hold the spinning mechanism in a longitudinal constant position relative to the writing instrument; and a weight positioned on a side of the spinning mechanism and configured such that a weighted side of the spinning mechanism is oriented downwards when the spinning mechanism is not rotated.

2. The anti-fidgeting device of claim 1, wherein one or more of the second member, the first member, and the spinning mechanism are circular in shape.

3. The anti-fidgeting device of claim 1, wherein the second member and the first member comprise a first diameter and the spinning mechanism comprises a second diameter that is greater than the first diameter.

4. The anti-fidgeting device of claim 1, wherein the first member and the second member are formed of molded plastic.

5. The anti-fidgeting device of claim 4, wherein the spinning mechanism is formed of metal.

6. The anti-fidgeting device of claim 1, wherein the first member comprises one or more identification markings that are circular in shape and wherein the second member comprises one or more linear markings.

7. The anti-fidgeting device of claim 1, wherein the spinning mechanism comprises:

an inner ring that is attached to the writing instrument and is non-movable;

an outer ring that is movable; and one or more movable objects located between and held in place by the inner ring and outer ring.

8. The anti-fidgeting device of claim 1, further comprising a wing attached to the spinning mechanism and operable to receive a fragrance, wherein when the spinning mechanism is rotated, the fragrance is released from the wing.

9. The anti-fidgeting device of claim 8, further comprising an additional wing that is attached to the spinning mechanism and located approximately opposite the wing.

10. The anti-fidgeting device of claim 1, wherein one or more of the second member, the first member, and the spinning mechanism are circular in shape, wherein the second member and the first member comprise a first diameter and the spinning mechanism comprises a second diameter that is greater than the first diameter, wherein the first member and the second member are formed of molded plastic, wherein the spinning mechanism is formed of metal, wherein the first member comprises one or more identification markings that are circular in shape and wherein the second member comprises one or more linear markings, and wherein the spinning mechanism comprises:

an inner ring that is attached to the writing instrument and is non-movable;

an outer ring that is movable; and one or more movable objects located between and held in place by the inner ring and outer ring.

11. An anti-fidgeting device comprising:

a spinning mechanism;

a mount that is cylindrical, configured to receive a writing instrument, and configured to move longitudinally relative to the writing instrument when a force is applied to the mount, wherein the mount defines an inner surface that includes a set of grooves configured to hold the spinning mechanism in a longitudinal constant position relative to the writing instrument;

a first member coupled to the mount;

a second member and coupled to the mount; and a weight positioned on a side of the spinning mechanism and configured such that the weighted side of the spinning mechanism is oriented downwards when then spinning mechanism is not rotating, wherein the spinning mechanism is positioned at least partially between the first member and the second member and coupled to the mount, wherein the spinning mechanism is rotatable around the mount.

12. The anti-fidgeting device of claim 11, wherein one or more of the second member, the first member, and the spinning mechanism are circular in shape.

13. The anti-fidgeting device of claim 11, wherein the second member and the first member comprise a first diameter and the spinning mechanism comprises a second diameter that is greater than the first diameter.

14. The anti-fidgeting device of claim 11, wherein the first member and the second member are formed of molded plastic.

15. The anti-fidgeting device of claim 14, wherein the spinning mechanism is formed of metal.

16. The anti-fidgeting device of claim 11, wherein the first member comprises one or more identification markings that are circular in shape and wherein the second member comprises one or more linear markings, wherein one or more of the second member, the first member, and the spinning mechanism are circular in shape, wherein the second member and the first member comprise a first diameter and the spinning mechanism comprises a second diameter that is greater than the first diameter, wherein the first member and the second member are formed of molded plastic, wherein the spinning mechanism is formed of metal, and wherein the spinning mechanism comprises:

an inner ring that is attached to the writing instrument and is non-movable;

an outer ring that is movable; and one or more movable objects located between and held in place by the inner ring and outer ring.

17. An apparatus comprising:

a writing instrument;

a spinning device comprising:

a first member that is coupled to the writing instrument, wherein the writing instrument extends at least partially through the first member;

a second member that is coupled to the writing instrument, wherein the writing instrument extends at least partially through the second member;

a spinning mechanism that is positioned at least partially between the first member and the second member, wherein the writing instrument extends through the spinning mechanism, and wherein the spinning mechanism is rotatable around the writing instrument;

a mount that is cylindrical, configured to receive the writing instrument, and configured to move longitudinally relative to the writing instrument when a force is applied to the mount, wherein the mount defines an inner surface that includes a set of grooves configured to hold the spinning mechanism in a longitudinal constant position relative to the writing instrument; and a weight positioned on a side of the spinning mechanism and configured such that a weighted side of the spinning mechanism is oriented downwards when the spinning mechanism is not rotating.

18. The apparatus of claim 17, wherein one or more of the second member, the first member, and the spinning mechanism are circular in shape.

19. The apparatus of claim 17, wherein the second member and the first member comprise a first diameter and the spinning mechanism comprises a second diameter that is greater than the first diameter.

20. The apparatus of claim 17, wherein the first member and the second member are formed of molded plastic and the spinning mechanism is formed of metal, wherein the second member and the first member comprise a first diameter and the spinning mechanism comprises a second diameter that is greater than the first diameter, wherein the first member comprises one or more identification markings that are circular in shape and wherein the second member comprises one or more linear markings, and wherein the spinning mechanism comprises:

an inner ring that is attached to the writing instrument and is non-movable;

an outer ring that is movable; and one or more movable objects located between and held in place by the inner ring and outer ring.

* * * * *